United States Patent [19]
Yamashita et al.

[11] Patent Number: 5,812,495
[45] Date of Patent: Sep. 22, 1998

[54] ULTRASONIC RANGEFINDER

[75] Inventors: Muneharu Yamashita; Jun Tabota, both of Toyama-ken; Yasuharu Matsui, Toyama, all of Japan

[73] Assignee: Murata Manufacturing Co., Ltd., Japan

[21] Appl. No.: 668,411

[22] Filed: Jun. 21, 1996

[30] Foreign Application Priority Data

Jun. 23, 1995 [JP] Japan .................................. 7-158012

[51] Int. Cl.[6] ........................... G01S 15/00; G01N 29/00
[52] U.S. Cl. ............................................... 367/98; 73/631
[58] Field of Search ....................... 367/98, 900; 73/631, 73/900

[56] References Cited

U.S. PATENT DOCUMENTS

| | | | |
|---|---|---|---|
| 3,918,296 | 11/1975 | Kitada | 73/631 |
| 4,307,456 | 12/1981 | Ise et al. | 367/107 |
| 4,451,797 | 5/1984 | Bains, Jr. | 73/631 |
| 4,796,726 | 1/1989 | Kobayashi et al. | 367/99 |

*Primary Examiner*—Ian J. Lobo
*Attorney, Agent, or Firm*—Ostrolenk, Faber, Gerb & Soffen, LLP

[57] ABSTRACT

An ultrasonic rangefinder capable of effectively removing high-level, directly transmitted wave components. The rangefinder can be used even at low temperatures. The rangefinder comprises an input signal-processing circuit, an output signal-processing circuit, and a gain control circuit inserted between the input and output signal-processing circuits. The output signal-processing circuit includes a reception amplification circuit and a detection circuit, the reception amplification circuit having an amplifier. The gain control circuit lowers the gain of the reception amplification circuit to raise the undetected and detected input voltage levels applied to the detection circuit. The gain control circuit comprises three control devices. The first control device is driven into conduction when its input pulse signal varies from a low level to a high level. The second control device reduces the feedback resistance of the amplifier of the reception amplification circuit in response to conduction of the first control device. In response to conduction of the first control device, the third control device controls the time for which the second control device operates.

8 Claims, 6 Drawing Sheets

Output Level

Detectable Distance Range

ULTRASONIC RANGEFINDER

BACKGROUND OF THE INVENTION

1. Field of the Invention

The present invention relates to an ultrasonic rangefinder equipped with both a transmitting sensor and a receiving sensor and, more particularly, to techniques for suppressing effects of wave components traveling from the transmitting sensor directly to the receiving sensor.

2. Description of the Related Art

Figure 5:
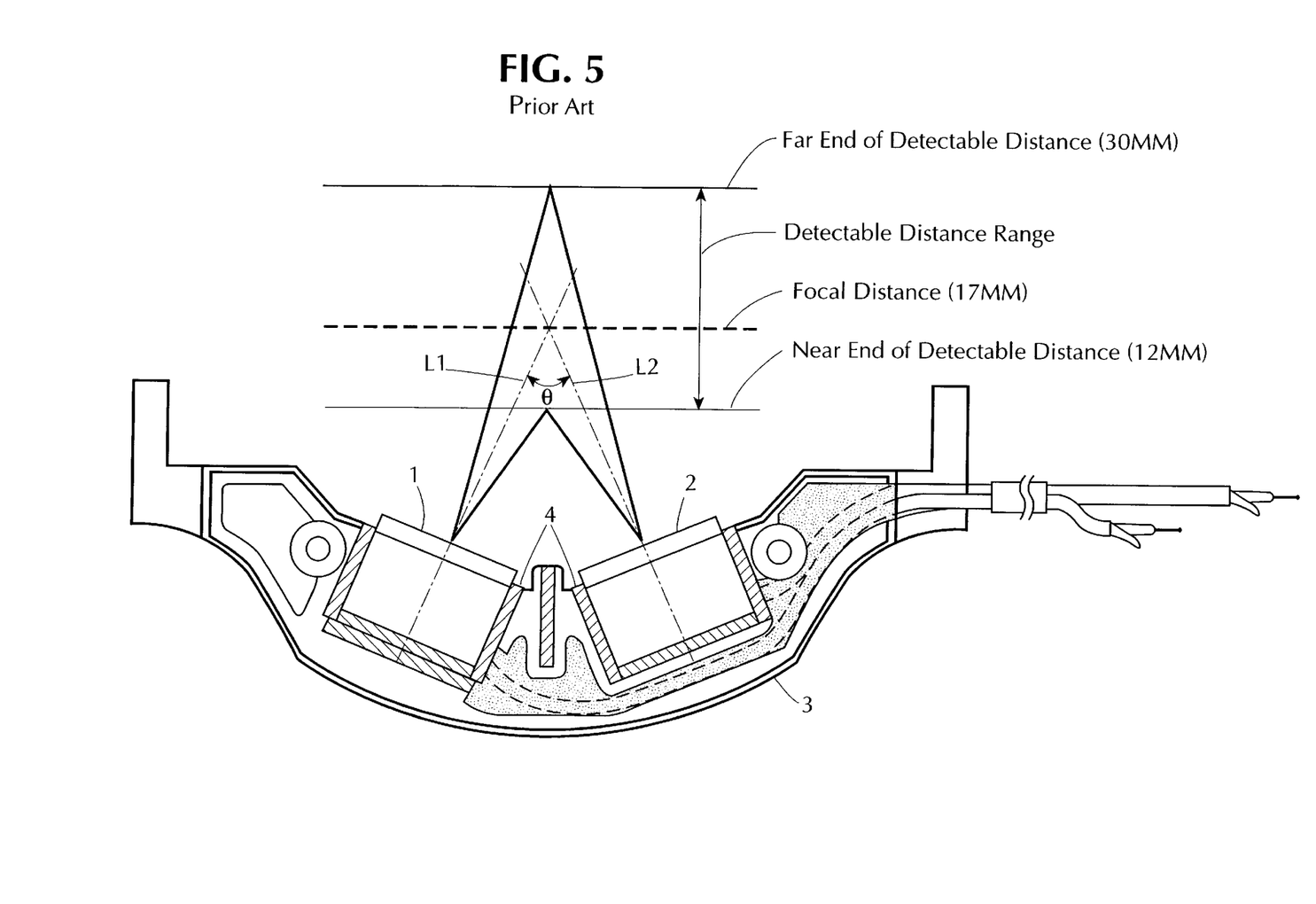
FIG. 5 is a cross-sectional view showing the structure of the ultrasonic rangefinder shown in FIGS. 1 and 2, as well as the structure of the prior art ultrasonic rangefinder.

One kind of ultrasonic rangefinder has a detectable distance range of from 12 to 30 mm. This ultrasonic rangefinder has a combination of an ultrasonic distance meter and signal-processing circuitry. As shown in FIG. 5, this ultrasonic distance meter comprises a transmitting sensor 1, a receiving sensor 2, and a body 3 for holding these sensors in position. The position of a detected distance of 17 mm provides the focal distance. Let L1 and L2 be the axes of the transmitting sensor 1 and the receiving sensor 2, respectively. These axes L1 and L2 intersect each other at an angle of $\ominus$ at the focal distance. In this ultrasonic distance meter, it is necessary to reduce vibrations transmitted from the transmitting and receiving sensors 1 and 2, respectively, to the body 3. For this reason, the distance meter is designed with these sensors 1 and 2 encased in a foamed material 4 such as expanded polyethylene having a density of about 0.07 g/cm$^3$.

Figure 6:
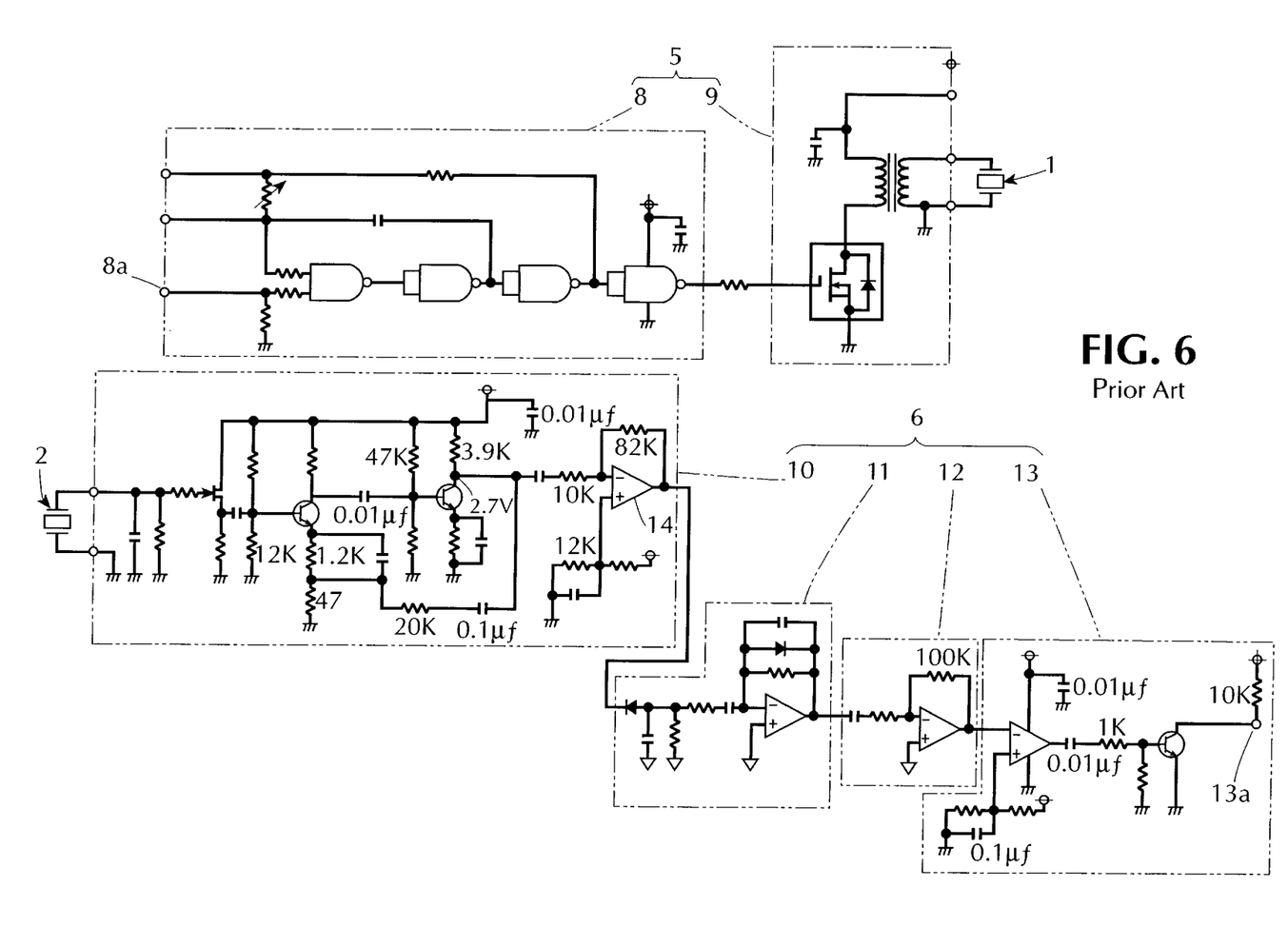
FIG. 6 is a circuit diagram of signal-processing circuits included in the prior art ultrasonic rangefinder.
Figure 7A:
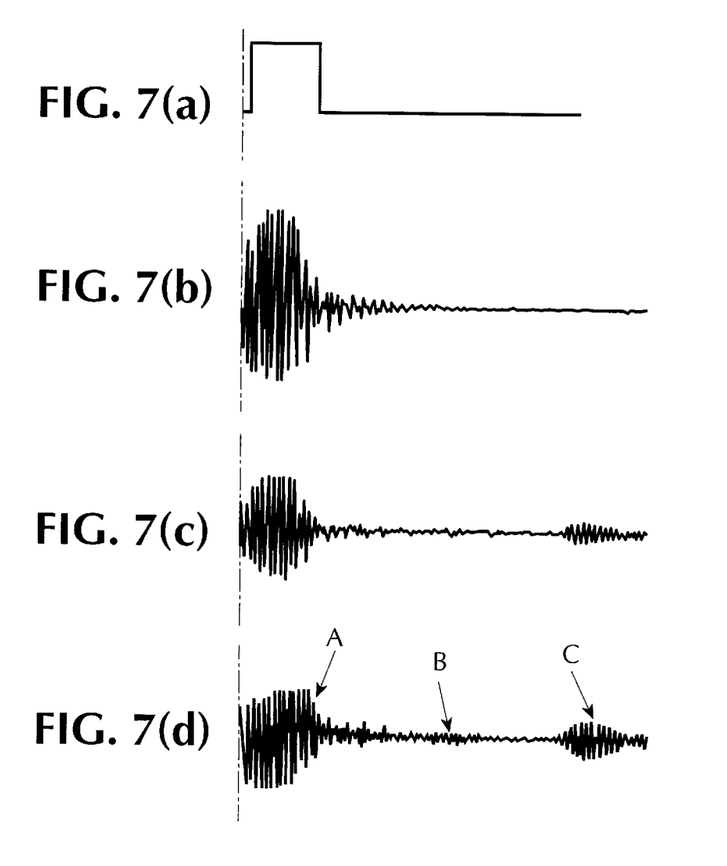

As shown in FIG. 6, the signal-processing circuit 5, an output signal-processing circuit 6, and a power circuit (not shown). The input signal-processing circuit 5 generates a pulse signal to be applied to the transmitting sensor 1, while the output signal-processing circuit 6 processes the output signal from the receiving sensor 2. This input signal-processing circuit 5 has an oscillator circuit 8 and a transmission amplification circuit, 9 connected between the oscillator circuit 8 and the transmitting sensor 1. An input pulse signal, which is also known as a burst signal, is applied to the oscillator circuit 8 via an input terminal 8a. The pulse signal applied to the oscillator circuit 8 takes the form as shown in FIG. 7(a) and ranges from 0 to 5 V. The oscillator circuit 8 is designed so that it generates an output signal at a frequency of 380 kHz during the interval when the input pulse signal is held at a high level (5 V), for example, 25 μs. The transmission amplification circuit 9 which receives the output signal from the oscillator circuit 8 applies a voltage signal having a waveform as shown in FIG. 7(b) to the transmitting sensor 1. In response to this voltage signal, the transmitting sensor 1 emits ultrasonic waves toward an object under examination (not shown).

The output signal-processing circuit 6 in the signal-processing circuitry is composed of a reception amplification circuit 10, a detection circuit 11, a differentiator circuit 12, and a comparator 13. The receiving sensor 2 is connected with the reception amplification circuit 10, which has a given gain. A microcomputer (not shown) for executing signal processing is connected to an output terminal 13a of the comparator 13.

Waves produced by the transmitting sensor 1 are reflected by the object under examination and enter the receiving sensor 2. This receiving sensor 2 produces a voltage signal having a waveform as shown in FIG. 7(c), and the reception amplification circuit 10, which has a filtering function, produces a voltage signal having a waveform as shown in FIG. 7(d). Analysis of the voltage signal produced from the reception amplification circuit 10 reveals that the signal contains: (1) an electromagnetic noise component A produced when the transmitting sensor 1 is activated; (2) a directly transmitted wave component B which is produced by direct propagation of vibrations via the body 3 of the ultrasonic distance meter after the vibrations are generated by activating the transmitting sensor 1; and (3) an echo wave component C coming from the object.

Figure 8:
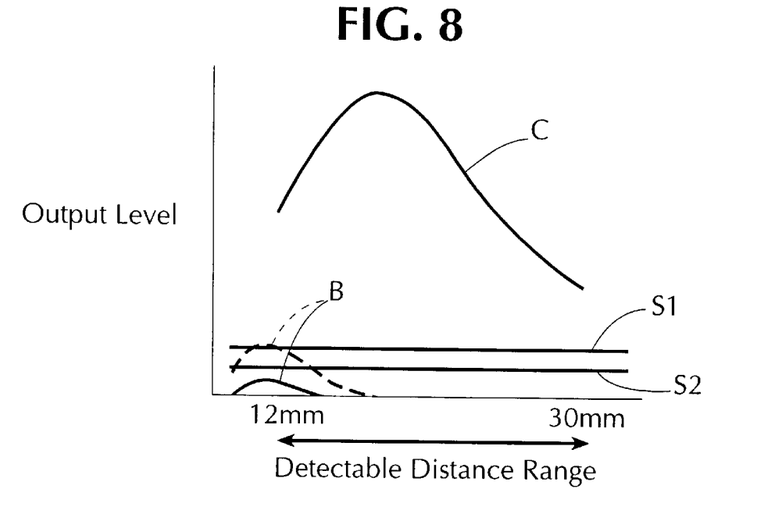
FIG. 8 is a waveform diagram illustrating the operation of a detection circuit included in the signal-processing circuits shown in FIG. 6.
Figure 9A:
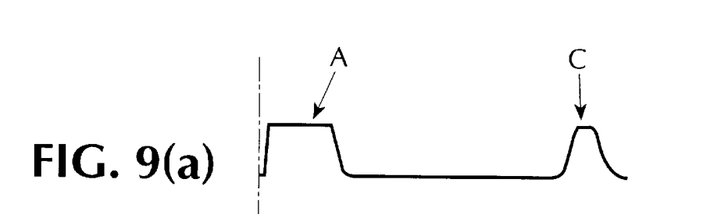
FIGS. 9(a)–9(c) are waveform diagrams showing voltage signals processed by the signal-processing circuits shown in FIG. 6.

The detection circuit 11 has a slicing function, i.e., it does not detect signals of levels lower than a certain level. Therefore, the low-level, directly transmitted wave component B contained in the voltage signal is removed. In particular, as shown in FIG. 8, the detection circuit 11 has a given detected input voltage level S1, above which signals are detected, and a given undetected input voltage level S2, below which signals are not detected. The given input voltage level S1 is based on the fact that the feedback resistance of an amplifier 14 forming the reception amplification circuit 10 is constant. Signals of levels lower than the undetected input voltage level S2 are removed by the slicing function. The directly transmitted wave component of the output voltage signal from the reception amplification circuit 10 is indicated by B in FIG. 8. The echo wave component is indicated by C. The electromagnetic noise component A is not shown. Therefore, after the slicing function, the detection circuit 11 delivers a voltage signal as shown in FIG. 9(a) to the differentiator circuit 12, the voltage signal containing only the electromagnetic noise component A and the echo wave component C.

Figure 9B:
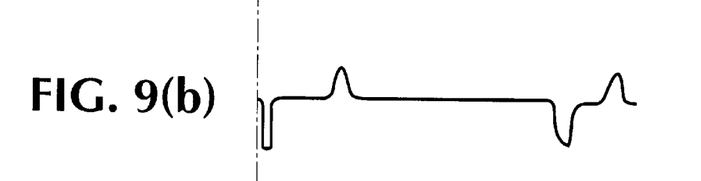
Figure 9C:
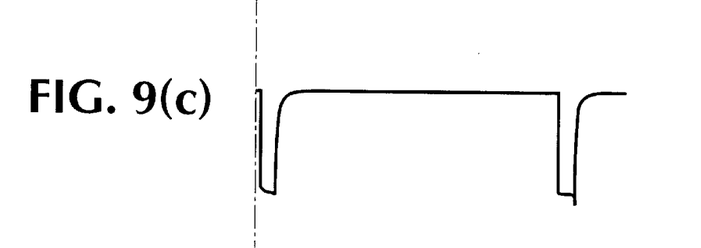

Then, this voltage signal is shaped into a waveform as shown in FIG. 9(b) by the differentiator circuit 12 and sent to the comparator 13. As shown in FIG. 9(c), the comparator 13 sends a signal to the microcomputer only when the voltage signal exceeds a certain level. This microcomputer calculates the distance L to the object from time Tx, acoustic velocity V, and the angle $\ominus$ defined between the axes L1 and L2 of the transmitting sensor 1 and the receiving sensor 2, respectively, intersecting each other at the focal distance, according to the equation $$L = \tfrac{1}{2} \cdot Tx \cdot V \cdot \cos(\ominus/2),$$

in which Tx is the time between the instant when the input pulse signal is applied and the instant when echo waves are detected. When this calculation is performed, the electromagnetic noise component A contained in the output signal from the comparator 13 is detected and removed.

In summary, in the aforementioned prior art ultrasonic rangefinder, the detection circuit 11 forming the output signal-processing circuit 6 has a given detected input voltage level Si and undetected input voltage level S2. The detection circuit further has a slicing function, i.e., the circuit removes signals having levels lower than the undetected input voltage S2. Since the directly transmitted wave component B contained in the output voltage signal from the reception amplification circuit 10 is eliminated by the slicing function, signals passing through stages following the detection circuit 11 contain only the electromagnetic noise component A and the echo wave component C.

However, since the transmitting sensor 1 and the receiving sensor 2 are supported by the foamed material 4, a problem can occur, namely that the vibration propagation-hindering characteristics of the foamed material 4 deteriorate as the temperature is lowered. Consequently, at low temperatures, the level of the directly transmitted wave component B contained in the output voltage signal from the reception amplification circuit 10 may rise, as indicated by the broken line in FIG. 8.

When the level of the directly transmitted wave component B rises, the detection circuit 11, which has its detected input voltage S1 and undetected input voltage S2 clamped at a given level, can no longer remove the directly transmitted wave component B. Therefore, voltage signals containing the directly transmitted wave component B appear in stages following the detection circuit 11. Since this directly transmitted wave component B is produced immediately after the input pulse signal is applied to the input signal-processing circuit 5, if the distance to the object is short, e.g., 12 mm, and if the reflection time is as short as 60μs, then the directly transmitted wave component B and the echo wave component C appear within quite a short interval of time. Both components B and C are detected. As a result, an erroneous distance measurement inevitably occurs due to inclusion of the directly transmitted wave component B.

SUMMARY OF THE INVENTION

In view of the foregoing problems, the present invention has been made. It is an object of the invention to provide an ultrasonic rangefinder which is capable of effectively removing even high-level, directly transmitted wave components and can be used at low temperatures.

An ultrasonic rangefinder according to the present invention comprises an ultrasonic distance meter equipped with a transmitting sensor and a receiving sensor arranged so that the axes of the sensors intersect each other at a focal distance, an input signal-processing circuit for processing a pulse signal fed to the transmitting sensor, and an output signal-processing circuit for processing the output signal from the receiving sensor. A reception amplification circuit and a detection circuit are connected in series with the output signal-processing circuit, the reception amplification circuit including an amplifier.

In order to achieve the above-described object, a gain control circuit is connected between the input signal-processing circuit and the output signal-processing circuit. This gain control circuit lowers the gain of the reception amplification circuit and sets a high detected input voltage level and a high undetected input voltage level in the detection circuit. After a lapse of a given time, the gain control circuit returns the gain of the reception amplification circuit to its original level and resets these two input voltages to lower levels.

The gain control circuit comprises a first control device, a second control device, and a third control device. When the input pulse signal varies from a low level to a high level, the first control device conducts. When the input pulse signal changes from a high level to a low level, the first control device is cut off. The second control device reduces the feedback resistance of the amplifier in response to the conduction of the first control device. In response to the cutoff of the first control device, the second control device increases the feedback resistance of the amplifier. The third control device controls the operation time of the second control device in response to the cutoff of the first control device.

The aforementioned first control device is preferably a transistor. The second control device is preferably a JFET. The third control device is preferably a combination of a resistor and a capacitor. Preferably, the axes of the transmitting and receiving sensors which intersect each other at the focal distance meet each other at an angle which maximizes the reception sensitivity of the receiving sensor.

In the above-described structure, when the input pulse signal changes from a low level to a high level, the first control device conducts. This causes the second control device to reduce the feedback resistance of the amplifier. As a result, the gain of the reception amplification circuit including the amplifier drops. The detected voltage level and the undetected voltage level applied to the detection circuit are set to high levels. Accordingly, even if the directly transmitted wave component included in the output voltage signal from the reception amplification circuit assumes a high level, it is unlikely that the directly transmitted component will be detected by the detection circuit. As a consequence, stages following the detection circuits are less affected by the directly transmitted wave component.

Other objects and features of the invention will appear in the course of the description of an embodiment thereof, which follows.

BRIEF DESCRIPTION OF THE DRAWINGS

FIGS. 3(a)–3(d) are is a waveform diagrams illustrating the operation of the signal-processing circuits shown in FIGS. 1 and 2;

FIGS. 7(a)–7(d) are waveform diagrams showing voltage signals processed by signal-processing circuits shown in FIG. 6;

DETAILED DESCRIPTION OF EMBODIMENTS OF THE INVENTION

Figure 1:
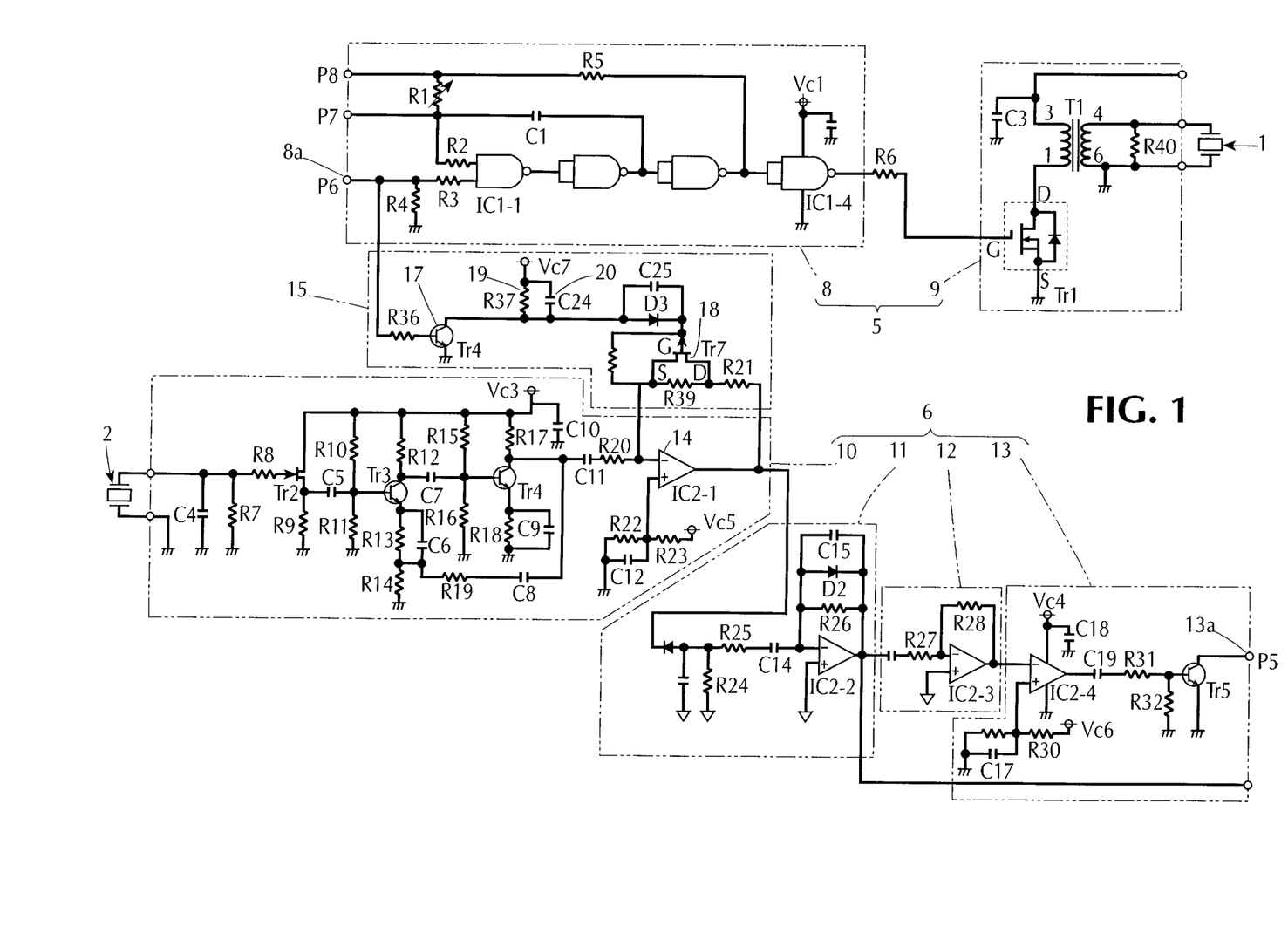
FIG. 1 is a circuit diagram of signal-processing circuits included in an ultrasonic rangefinder according to an embodiment of the present invention.
Figure 2:
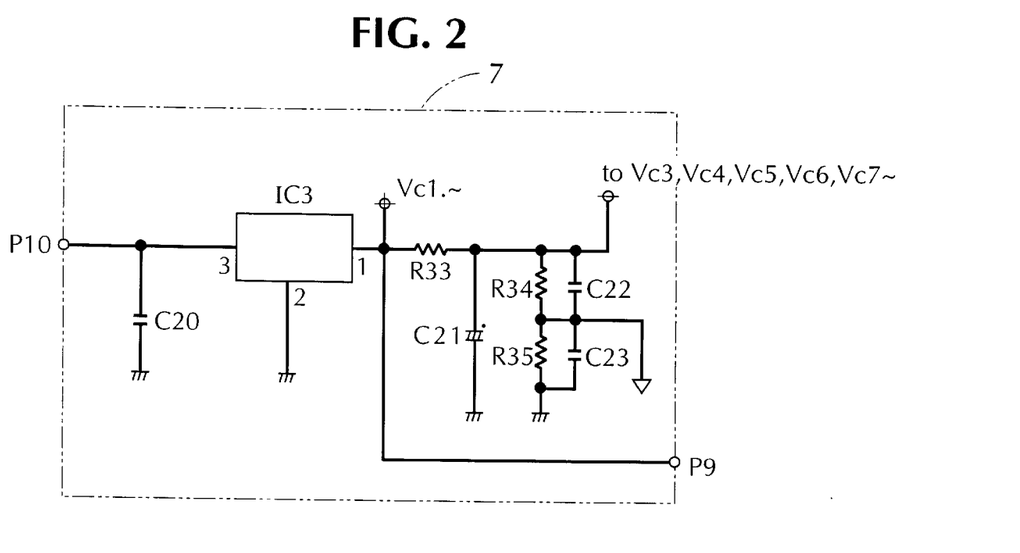
FIG. 2 is a circuit diagram of another signal-processing circuit included in the ultrasonic rangefinder partially shown in FIG. 1.
Figure 3A:
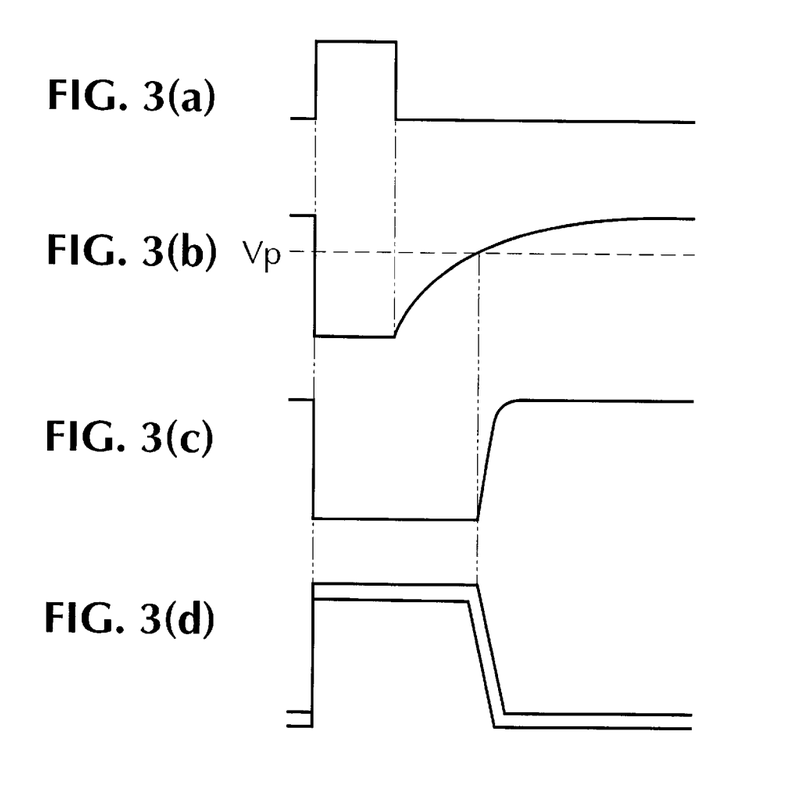
Figure 4:
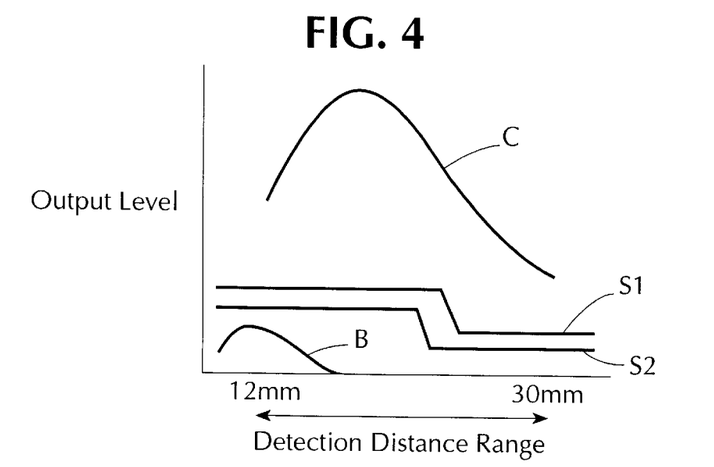
FIG. 4 is a graph illustrating the operation of the detection circuit shown in FIG. 1.

FIGS. 1 and 2 show the signal-processing circuitry of an ultrasonic rangefinder according to an embodiment of the present invention. FIGS. 3(a)–3(d) illustrate the operation of the signal-processing circuitry. FIG. 4 illustrates the operation of a detection circuit included in the ultrasonic rangefinder.

The signal-processing circuitry includes an input signal-processing circuit 5 and an output signal-processing circuit 6, similar to those in the prior art configuration. These signal-processing circuits further include a gain control circuit 15 inserted between the input signal-processing circuit 5 and the output signal-processing circuit 6. The overall structure of the present example of an ultrasonic distance meter is shown in FIG. 5. It is to be noted that like components are indicated by like reference numerals in various figures and that those components which have been already described will not be described below.

The present example of an ultrasonic rangefinder has a detectable distance range of from 12 to 30 mm. This rangefinder comprises the ultrasonic distance meter shown in FIG. 5 and signal-processing circuitry. The signal-processing circuitry comprises the signal-processing circuits shown in FIGS. 1 and 2 (i.e., the input signal-processing circuit 5 for processing a pulse signal to be fed to the transmitting sensor 1 and the output signal-processing circuit 6 for processing the output signal from the receiving sensor 2) and a power circuit 7. The ultrasonic distance meter has a pair of sensors, i.e., the transmitting sensor 1 and the receiving sensor 2. The axes L1 and L2 of these sensors 1 and 2, respectively, intersect each other at an angle ⊖ at the focal distance of 17 mm. The sensors 1 and 2 are encased in foamed material 4.

The input signal-processing circuit 5 of the signal-processing circuitry comprises the oscillator circuit 8 and the transmission amplification circuit 9. connected between the oscillator circuit 8 and the transmitting sensor 1. An input pulse signal is applied to the oscillator circuit 8 via the input terminal 8a and assumes the waveform as shown in FIGS. 3(a) and 7(a). This waveform takes either a low level of 0 V or a high level of 5 V. The high level is retained for 25 μs. This input signal-processing circuit 5 operates similarly to the prior art input signal-processing circuit.

The output signal-processing circuit 6 comprises the reception amplification circuit 10 including the amplifier 14, the detection circuit 11 connected in series with the reception amplification circuit 10, the differentiator circuit 12, and the comparator 13. The receiving sensor 2 is connected with the reception amplification circuit 10. A microcomputer (not shown) is connected with the output terminal 13a of the comparator 13. This output signal-processing circuit 6 operates in the same manner as the prior art output signal-processing circuit.

Connected between the input signal-processing circuit 5 and the output signal-processing circuit 6 is the gain control circuit 15 which lowers the gain of the reception amplification circuit 10 to thereby raise the detected voltage level S1 and the undetected voltage level S2 applied to the detection circuit 11. After a lapse of a given time, the gain control circuit 15 returns the gain of the reception amplification circuit 10 to its original level and lowers the input voltages levels S1 and S2.

This gain control circuit means 15 has a first control device, a second control device, and a third control device. The first control device includes a transistor 17 which conducts when the input pulse signal changes from the low level of 0 V to the high level of 5 V. The transistor 17 is cut off when the input pulse signal returns from the high level of 5 V to the low level of 0 V. The second control device includes a JFET 18 which reduces the feedback resistance of the amplifier 14 in response to the conduction of the transistor 17 and increases the feedback resistance in response to the cutoff of the transistor 17. The third control device includes a combination of a resistor 19 and a capacitor 20. This combination controls the time for which the transistor 18 operates.

In the present example of signal-processing circuitry, the transmitting sensor 1, the input signal-processing circuit 5, the receiving sensor 2, and the output signal-processing circuit 6 operate in the same way as in the prior art circuits. Concurrently, the gain control circuit 15 is operated. Specifically, as shown in FIG. 3(a), when the pulse signal applied to the input terminal 8a of the oscillator circuit 8 of the input signal-processing circuit 5 makes a transition from 0 V to 5 V, the transistor 17 conducts. At the same time, as shown in FIG. 3(b), the gate voltage of the transistor 18 drops below its pinchoff voltage Vp. This induces conduction between the source and drain which short circuits a resistor R39. As a result, the feedback resistance of the amplifier 14 decreases.

When the feedback resistance of this amplifier 14 decreases in this way, the gain of the reception amplification circuit 10 drops, as shown in FIG. 3(c). As a consequence, the detected input voltage level S1 and the undetected input voltage level S2 to the detection circuit 11 connected in series with this reception amplification circuit 10 are set to higher values, as shown in FIG. 3(d). Therefore, even if the directly transmitted wave component B contained in the voltage signal produced from the reception amplification circuit 10 assumes a high level at low temperatures, the directly transmitted wave component B is no longer detected by the detection circuit 11, because the undetected input voltage level S2 to the detection circuit 11 is higher.

As shown in FIG. 3(a), when the input pulse signal changes from 5 V to 0 V after a lapse of the high-level (5 V) retention time, the transistor 17 is cut off. Then, as shown in FIG. 3(b), the gate voltage of the transistor 18 gradually rises while limited by the action of the resistor 19 and the capacitor 20. After a lapse of a given period, the voltage increases beyond the pinchoff voltage Vp, thus terminating conduction between the source and drain. This increases the feedback resistance of the amplifier 14. Therefore, as shown in FIG. 3(c), the gain of the reception amplification circuit 10 returns to its original high level. As a result, as shown in FIG. 3(d), the detected input voltage level S1 and the undetected input voltage level S2 to the detection circuit 11 again assume low values, since the original gain of the reception amplification circuit 10 is regained.

More specifically, in this example of detection circuit 11, as shown in FIG. 4, the detected input voltage level S1 and the undetected input voltage level S2 have high values immediately after an input signal is applied. After a lapse of a given time, these values are made lower. Therefore, the directly transmitted wave component B is removed even if it is at a high level, as long as the input signal is lower than the undetected voltage level S2. The directly transmitted wave component B does not appear in the stages following the detection circuit 11. Of course, the given period during which the detected input voltage level S1 and the undetected input voltage level S2 to the detection circuit 11 have their high values is set so that this period does not end before the directly transmitted wave component B appears.

In this way, it is assured that the detection circuit 11 detects the echo wave component C contained in the output voltage signal from the reception amplification circuit 10 and produces a corresponding output signal, because the echo wave component C becomes higher in level than the detected input voltage level S1 of the detection circuit 11. Accordingly, this detection circuit 11 delivers a voltage signal as shown in FIG. 9(a), i.e., having a waveform containing only the electro-magnetic noise component A and the echo wave component C, to the differentiator circuit 12. In the subsequent circuit stages, conventional processing is performed.

Where the gain of the reception amplification circuit 10 is lowered by the gain control circuit 15 as described above, there arises the possibility that even the echo wave component C contained in the output voltage signal from the reception amplification circuit 10 may not be readily detected. To prevent this difficulty, it is important to maximize the reception sensitivity of the receiving sensor 2 forming the ultrasonic distance meter. In the present example, the angle ⊖ shown in FIG. 5, i.e., the angle ⊖ made between the axes L1 and L2 of the transmitting sensor 1 and the receiving sensor 2, respectively, at the focal distance of 17 mm, is set so that the reception sensitivity of the receiving sensor 1 is increased to its maximum level. That angle has been found to be 46±3°. Where this configuration is adopted, the amount of signal which enters the receiving sensor 2 after being produced by the transmitting sensor 1 and reflected by the object under examination is sufficient.

As described thus far, in the novel ultrasonic rangefinder, the first control device is biased into conduction when the input pulse signal varies from a low level to a high level. The second control device reduces the feedback resistance of the amplifier, thus lowering the gain of the reception amplification circuit including the amplifier. The detected and undetected input voltages of the detection circuit are thereby set to higher levels. Therefore, even if the directly transmitted wave component contained in the voltage signal received from the reception amplification circuit assumes a higher level at low temperatures, the directly transmitted wave component is no longer detected by the detection circuit. Hence, the stages following the detection circuit are less affected by the directly transmitted wave component. Thus, if the directly transmitted wave component and the echo wave component appear within a short interval of time of each other, the directly transmitted wave component is prevented from being detected. Consequently, misreadings are prevented.

Although the present invention has been described in relation to particular embodiments thereof, many other variations and modifications and other uses will become apparent to those skilled in the art. Therefore, the present invention is not limited by the specific disclosure herein.

What is claimed is:

1. An ultrasonic rangefinder comprising:
   an ultrasonic distance meter including a transmitting sensor and a receiving sensor, said sensors having axes intersecting each other at a focal distance;
   an input signal-processing circuit for processing an input pulse signal to be applied to said transmitting sensor;
   an output signal-processing circuit for processing an output signal from said receiving sensor;
   a reception amplification circuit and a detection circuit included in said output signal-processing circuit, said reception amplification circuit including an amplifier, said reception amplification circuit having a gain, said detection circuit having a detected voltage level and an undetected voltage level which are responsive to said gain;
   a feedback resistance coupled to said amplifier for determining said gain of said reception amplification circuit;
   a gain control circuit connected between said input signal-processing circuit and said output signal-processing circuit, said gain control circuit being operative to lower the gain of said reception amplification circuit so as to raise said detected and undetected voltage levels and then to return the gain of said reception amplification circuit to its original level after a lapse of a given operation time so as to lower said detected and undetected voltage levels;
   said gain control circuit comprising:
      a first control device which conducts when the input pulse signal is varied from a low level to a high-level and is cut off when said input pulse signal is varied from a high level to a low level;
      a second control device which reduces said feedback resistance coupled to said amplifier in response to conduction of said first control device and increases said feedback resistance in response to cutoff of said first control device; and
      a third control device which controls said second control device in response to cutoff of said first control device.

2. The ultrasonic rangefinder of claim 1, wherein said first control device is a transistor, said second control device is a JFET, and said third control device is a combination of a resistor and a capacitor.

3. The ultrasonic rangefinder of claim 1, wherein the axes of said transmitting and receiving sensors intersect each other at such an angle that reception sensitivity of said receiving sensor is maximized.

4. The ultrasonic rangefinder of claim 3, wherein said angle is 46±3°.

5. The ultrasonic rangefinder of claim 4, wherein said focal distance is 17 mm.

6. The ultrasonic rangefinder of claim 5, wherein said rangefinder has a detectable distance range of 12–30 mm.

7. An ultrasonic rangefinder comprising:
   an ultrasonic distance meter including a transmitting sensor and a receiving sensor, said sensors having axes intersecting each other at a focal distance;
   an input signal-processing circuit for processing an input pulse signal to be applied to said transmitting sensor;
   an output signal-processing circuit for processing an output signal from said receiving sensor;
   a reception amplification circuit included in said output signal-processing circuit, said reception amplification circuit having a gain; and
   a gain control circuit connected between said input signal-processing circuit and said output signal-processing circuit, said gain control circuit being operative to lower the gain of said reception amplification circuit, and then to return the gain of said reception amplification circuit to its original level after a lapse of a given length of time;
   wherein said reception amplification circuit includes an amplifier, a feedback resistance being coupled to said amplifier for determining said gain of said reception amplification circuit, and wherein said gain control circuit adjusts said feedback resistance in order to adjust said gain;
   said gain control circuit comprising:
      a first control device which conducts when the input pulse signal is varied from a low level to a high level and is cut off when said input pulse signal is varied from a high level to a low level;
      a second control device which reduces said feedback resistance coupled to said amplifier for said given length of time, in response to conduction of said first control device, and increases said feedback resistance in response to cutoff of said first control device; and
      a third control device which controls said given length of time of said second control device in response to cutoff of said first control device.

8. The ultrasonic rangefinder of claim 7, wherein said first control device is a transistor, said second control device is a JFET, and said third control device is a combination of a resistor and a capacitor.

* * * * *